THOMAS H. FLOWERS,
ROBERT C. BARKER,
INVENTORS

BY Hall + Houghton
ATTORNEY

Jan. 10, 1961 T. H. FLOWERS ET AL 2,967,911

TELEPHONE BELL RINGING CIRCUITS

Filed Nov. 13, 1956 2 Sheets-Sheet 2

THOMAS H. FLOWERS,
ROBERT C. BARKER,

INVENTORS

BY Hall & Houghton

ATTORNEY

United States Patent Office 2,967,911

Patented Jan. 10, 1961

2,967,911

TELEPHONE BELL RINGING CIRCUITS

Thomas Harold Flowers, Mill Hill, London, and Robert Charles Barker, Dollis Hill, London, England, assignors to Her Majesty's Postmaster General, London, England Filed Nov. 13, 1956, Ser. No. 621,592

Claims priority, application Great Britain Nov. 14, 1955

3 Claims. (Cl. 179—84)

This invention relates to circuits for ringing a bell at a station at the end of a line connected to a telephone exchange and particularly to an electronic exchange. In existing exchanges it is common practice to provide a polarised bell such as a magneto bell in series with a capacitor at the station and to send from the exchange a low-frequency, e.g. 20 c./s., alternating current which rings the bell to call the subscriber to the telephone when he is wanted for an incoming call. The ringing current is applied by a control equipment which is one of a number in a common group and is transmitted over at least the last switch in the chain of connector switches from the calling to the called line. When the call is answered, the control equipment trips the ringing and performs other operations which are not relevant to this invention. In electronic exchanges a difficulty arises because the connector switches cannot be economically constructed to transmit the power which is needed to operate a conventional polarised bell, and either the signal which is sent from the control equipment must be amplified in the equipment individual to the line or some different, more sensitive, and in consequence more expensive kind of bell must be used.

The present invention provides, in a simple and convenient manner, amplification of the control signal from common equipment and a check that the bell is being rung.

According to the present invention a bell ringing circuit for a subscriber's telephone station of a telephone exchange comprises a bell fed from an exchange central D.C. battery feeding the subscriber's line from the outgoing side of exchange switches, and a circuit for receiving a ringing signal sent out from the exchange over the exchange switches and demodulating the signal and applying the demodulated signal to a transistor connected to the bell for controlling the ringing thereof by power from the D.C. battery.

In one embodiment of the invention a magneto bell is employed and is in series connection with a capacitor and the exchange battery. The transistor is connected in parallel with the bell and capacitor and provides a path whose resistance is under the control of the ringing signal. A further transistor may be arranged in series connection with the bell.

In another embodiment of the invention a D.C. bell is used and is connected to the transistor in a manner such that the emitter-collector circuit of the transistor is in series connection with the bell. The ringing control signal controls the conductivity of the emitter-collector path and thus the ringing of the D.C. bell.

The transistors may be of the p–n–p or n–p–n type.

Figure 1:
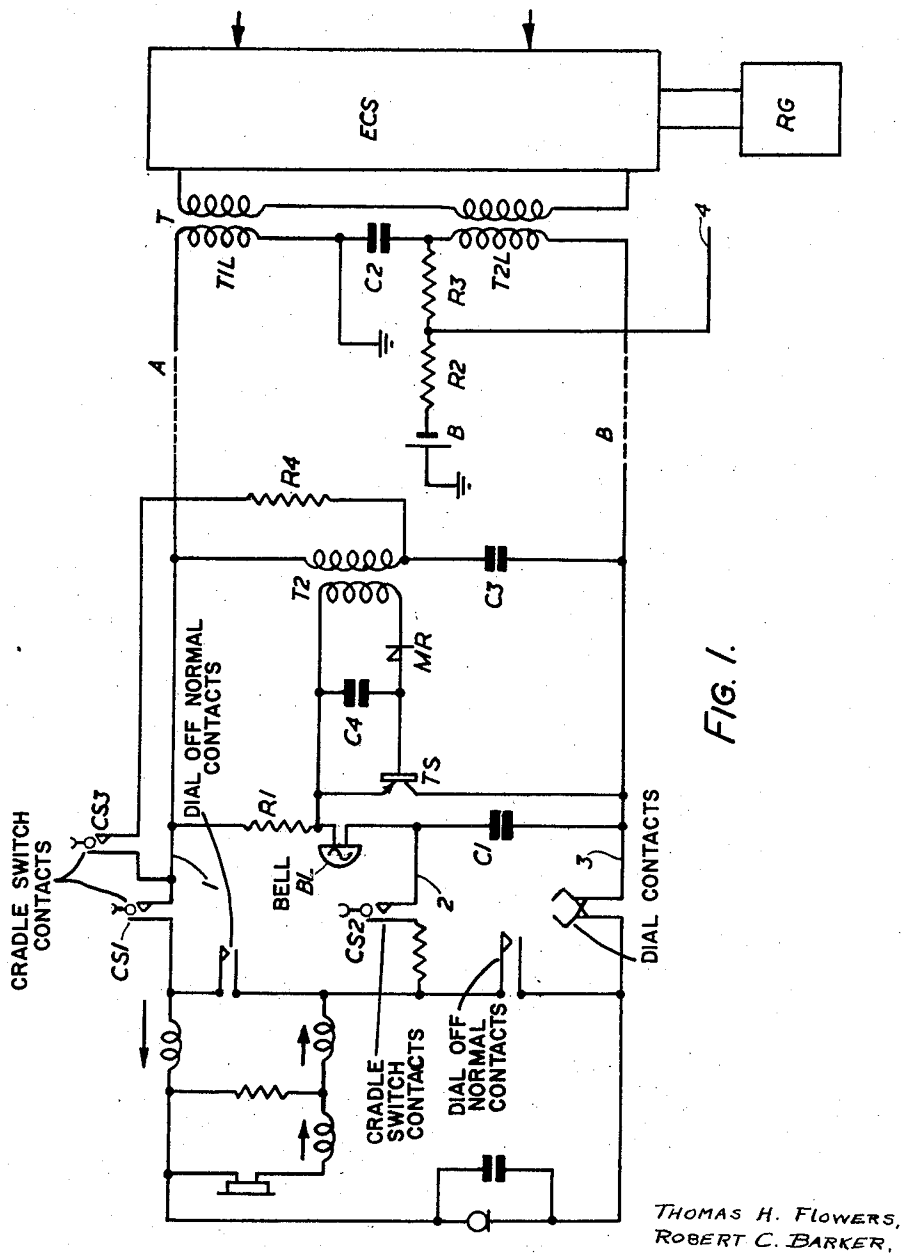
Figure 2:
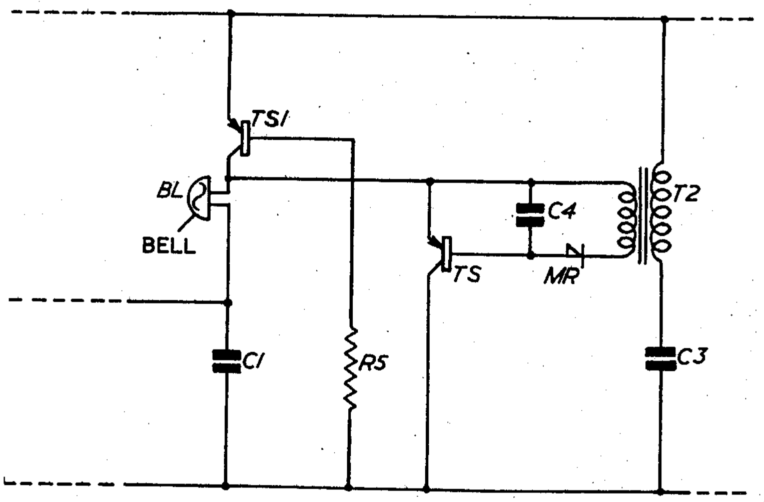

Embodiments of the invention will now be described in greater detail with reference to the accompanying drawings of which:

Fig. 1 shows the bell-ringing part of the station apparatus and part of the exchange equipment, and Fig. 2 shows a modification of the circuit of Fig. 1.

Referring to Fig. 1, A and B are the two wires of a telephone line, and C1, BL and R1 are respectively a capacitor, a magneto bell, and a resistor in series across the line at the station end. Leads 1, 2 and 3 are joined to a conventional telephone circuit having cradle-switch contacts CS1, CS2. The line is terminated at the exchange end by a transformer T which includes a capacitor C2 between two halves T1L, T2L of the line winding of transformer T which has its secondary winding connected to an exchange connector switch ECS over which calls to and from the line are made. One side of the capacitor C2 is earthed and the other is joined via resistors R3 and R2 to the negative pole of a 50-volt exchange battery B, the positive pole of which is earthed. The junction of the resistors R2 and R3 is connected to a lead 4 the potential of which varies according to the current passing over the line and serves, inter alia, to control the calls made to and from the line.

The bell is rung by an audio-frequency signal modulated at a low frequency sent out from the exchange over the transformer T and the line AB. This is indicated schematically in the drawing which shows a ringing generator RG connected to the exchange switch ECS. The signal is received by a circuit comprising capacitor C3 and the primary winding of transformer T2 in series, which circuit is preferably tuned to the audio frequency. The signal is demodulated by rectifier MR and capacitor C4 and applied to the emitter-base circuit of a transistor TS so as to increase the conduction between the emitter and collector which are bridged across the capacitor C1 and the bell BL.

In operation, the current round the line loop is normally small because the E.M.F. in the emitter-base circuit is almost zero. Hence the capacitor C1 is charged to the potential of the exchange battery and no current flows in the bell coils. A modulated audio-frequency ringing signal when received at the station causes a signal at the frequency of the modulation to be applied to the emitter-base circuit of the transistor MR and hence current of the modulation frequency flows in the circuit comprising capacitor C1, bell BL, emitter and collector of the transistor TS. The signal repeatedly opens and closes the shunt circuit, comprising the emitter-collector circuit of the transistor, across the bell-capacitor combination. The bell is thus caused to ring by a low-frequency current the power for which is derived primarily from the exchange battery, the signal sent out from the exchange being a low-power audio-frequency signal suitable for transmission through electronic switches. The current drawn from the exchange battery when the bell is rung varies the potential of the lead 4 which thus provides to the exchange apparatus a check signal that the ringing is effective.

When the call is answered the low D.C. resistance of the telephone instrument so reduces the potential across the A and B wires that there is no risk of speech or signal currents causing the bell to ring. The circuit C3, T2 may, however, cause attenuation distortion of the speech transmission, which distortion may be reduced by short-circuiting the transformer or shunting it by a resistor R4 when the instrument is removed from the cradle-switch and additional cradle-switch contacts CS3 are closed. The voltage across the contact CS3 due to the resonant circuit assists in avoiding mis-operation due to tarnish films on the contacts.

Alternatively the circuit C3, T2 may be disconnected from the A and B wires by means of a suitable contact operated by the cradle switch. If it is found that the attenuation distortion is negligible, these precautions are unnecessary.

Long lines may provide enough series impedance at the modulation frequency of the ringing signal so that the resistor R1 may then be omitted. In practice it is found, however, that a resistor of 4000 ohms permits a satisfactory ring with any length of line and is preferably included in all telephones in the interests of uniformity. It has the still further advantage of reducing the feedback between the emitter-base and the emitter-collector circuit at the transistor TS. According to the poling of the transformer T2 windings, the change of potential between the A and B wires due to change of emitter-collector conduction can, when transferred to the secondary of T2, either aid or oppose the said change of transistor emitter-collector conduction. If it aids and the value of R1 is too small the circuit becomes unstable. If it opposes the signal voltage required to produce a satisfactory ring may be excessive. It has been found advantageous to use the voltage aiding polarity of the transformer T2 together with a resistor R1 of a value which prevents instability by a considerable margin.

The audio frequency signal sent out from the exchange may be chopped or otherwise modulated at a low frequency, e.g. 20 c./s., and interrupted at a required rhythm. Thus, the signal comprises a current of frequency 3 kc./s. chopped to produce 25 millisecond pulses of alternating current separated by 25 millisecond gaps, these pulses being further interrupted so that in cycles of 3 seconds period there are two 0.4 second pulses of chopped audio frequency separated by 0.2 second of silence and followed by 2 seconds of silence.

Other frequencies than 3 kc./s., for example 2 kc./s., can be used so that selective ringing on shared-service lines can be achieved. Since the line is looped, there is insufficient D.C. potential, when one subscriber of a shared line talks loudly or whistles during a call, to cause the other subscriber's bell to tinkle. Tinkling of one bell due to the other subscriber dialling is prevented by connecting a thermister in series with the bell.

If the circuit C3, T2 is tuned to the ringing frequency the turns ratio of the primary to secondary windings of the transformer T2 is preferably high e.g. 15 to 1. The rectifier MR may be a single element of the copper-oxide or selenium type but a germanium junction diode is preferred because the bend of the forward resistance characteristic occurs at a lower voltage than with the other types of rectifier. The capacitance C4 may be of 1 microfarad capacitance. The non-linear resistance of the emitter-base circuit of the transistor TS may be used to demodulate the ringing signal, the rectifier MR and capacitor C4 then being omitted and a capacitor bridged across the coils of the bell BL to act as a shunt for the higher frequency products of the demodulation of the signal. It has been found that the circuit as shown in the diagram gives a better and more reliable ring.

In the circuit described above, capacitor C1 is discharged through the low resistance of transistor TS and is charged through R1. It is necessary that adequate current flows through the bell coils in each of the two conditions. It may be desired to operate an electronic exchange from a battery of E.M.F. less than 50 volts in which case the value of R1 must be reduced. It will be observed that when TS is conducting between emitter and collector it not only discharges C1 but also draws current through R1. With low exchange voltage and a low value of R1 difficulty may then be encountered due to the large current in R1. This difficulty is avoided by replacing R1 by the emitter-collector path of a second transistor TS1 having its base connected through a resistor R5 as shown in Fig. 2. The maximum current which can flow through TS1 from emitter to collector is then to a first approximation proportional to the voltage across the telephone set and independent of the voltage between emitter and collector.

Although in the embodiments described above a magneto or A.C. bell has been used in conjunction with a transistor which provides a shunt path whose resistance is controlled in response to a ringing signal, it will be understood that the invention is not limited to this method.

For example, a D.C. bell with a restoring spring can be used with a series connected transistor. Thus, in an alternative circuit, the bell BL is replaced by a D.C. bell, R1 and C1 are omitted and the transistor TS of Figure 1 arranged with its collector connected to one terminal of the D.C. bell whose other terminal is joined to the wire B. The emitter of the transistor is connected to the wire A. The control circuit for the series-connected transistor is identical with the control circuit used in Figure 1 for transistor TS, that is, a capacitor (corresponding with C4, Figure 1) is connected between the emitter and base of the series connected transistor and a rectifier in series connection with the secondary winding of a transformer is connected across the capacitor (corresponding with MR and the primary winding of T2 in Figure 1). Variation of the conductivity of the series connected transistor feeds D.C. current pulses to the bell thus causing the latter to "ring" in the manner of an ordinary trembler bell.

It is also possible to use an ordinary trembler bell in which case the ringing is not chopped although it is still interrupted.

In all the embodiments of the invention described above, p-n-p transistors have been used as is apparent from Figures 1 and 2. It will however be understood that, with suitable circuit modifications, n-p-n transistors can be used. Thus, in the case of Figure 1 for example, it is necessary to reverse the polarity of rectifier MR and to return C4 and the secondary winding of T2 to wire B instead of to the junction between R1 and bell BL as at present.

We claim:

1. A bell ringing circuit for a subscriber's telephone station of a telephone exchange comprising in combination, a source of potential, a bell, a signal receiving circuit for receiving an activating signal, a rectifier circuit coupled to said signal receiving circuit to receive the output therefrom, a control circuit comprising a transistor switch whose conductivity is varied between conductive and non-conductive states by an output from said rectifier circuit to energize said bell from said source, and an instability preventing resistor means in series connection with the bell and the emitter-collector circuit of the transistor switch.

2. A bell ringing circuit for a subscriber's telephone station of a telephone exchange comprising in combination input terminals for connection to a subscriber's exchange lines, a subscriber's bell, a capacitor in series connection with said bell, said bell and capacitor being bridged across said input terminals, a signal receiving means bridged across said input terminals for receiving an activating signal from the exchange, a rectifier circuit coupled to said receiving means and a shunt circuit means having a resistive component, said shunt circuit means including a transistor switch bridged across said bell and capacitor, the conductivity of said transistor switch being varied between conductive and non-conductive states by an output from said rectifier circuit whereby said capacitor is discharged and charged through said bell.

3. The bell ringing circuit of claim 2 wherein said resistive component of the shunt circuit means is an emitter-collector circuit of a second transistor in series connection with said bell and in series connection with said transistor switch.

References Cited in the file of this patent

UNITED STATES PATENTS

| | | |
|---|---|---|
| 2,353,499 | Purington | July 11, 1944 |
| 2,759,179 | Kircher | Aug. 14, 1956 |
| 2,761,909 | Wallace | Sept. 4, 1956 |
| 2,808,463 | Jenkins | Oct. 1, 1957 |